Jan. 20, 1959 M. MAMON 2,870,268

TRANSISTOR CONTROLLED LOW LEVEL MAGNETIC AMPLIFIER

Filed Oct. 12, 1953 2 Sheets-Sheet 1

INVENTOR:
Michel Mamon

BY

Karl F. Ross
Agent

Jan. 20, 1959 M. MAMON 2,870,268

TRANSISTOR CONTROLLED LOW LEVEL MAGNETIC AMPLIFIER

Filed Oct. 12, 1953 2 Sheets-Sheet 2

INVENTOR:
Michel Mamon

BY

Karl F. Ross
Agent

United States Patent Office 2,870,268

Patented Jan. 20, 1959

2,870,268

TRANSISTOR CONTROLLED LOW LEVEL MAGNETIC AMPLIFIER

Michel Mamon, New York, N. Y., assignor of forty percent to George A. Rubissow, New York, N. Y., and sixty percent to Magnetic Precision Controls Inc., New York, N. Y., a corporation of New York Application October 12, 1953, Serial No. 385,580

7 Claims. (Cl. 179—171)

This invention relates to a low-level electromagnetic amplifier.

The main object of this invention is to provide a magnetic amplifier producing a high output when a low D.-C. input signal is applied to its control coils. More particularly, this invention aims at providing an amplifier with a power gain up to 50,000 or even higher, depending upon material and design.

A feature of the invention resides in the use of one or more transistors as passive impedance elements in the output circuit of the amplifier, thereby insuring a substantially linear input/output ratio as will be described more fully hereinafter.

This invention will be more fully understood and apprehended from the following description of several typical embodiments with reference to the accompanying drawing in which.

Figure 1:
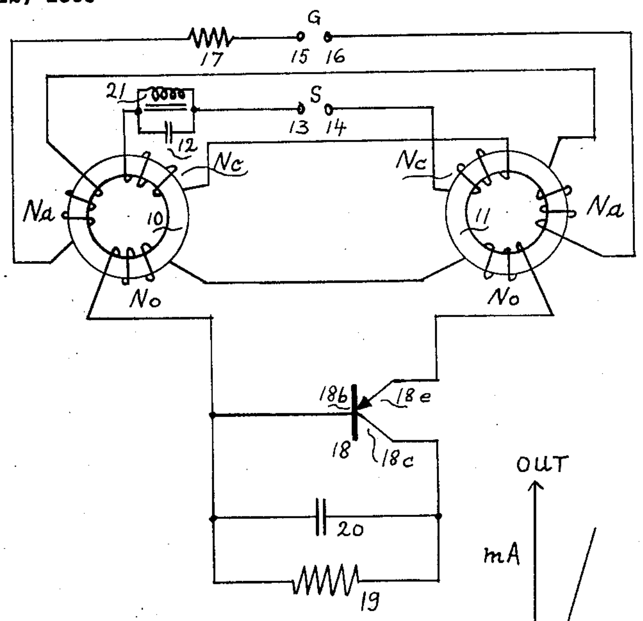
Fig. 1 is an embodiment of my magnetic amplifier having a transistor connected as a passive element in its output circuit.

The drawing shows several circuits each including a magnetic amplifier having two identical cores, preferably toroidal gapless ones of high permeability. These cores are designated by 10 and 11 in Figs. 1, 3, 5 and 7. Each of these cores is provided with at least three windings:

Winding $N_A$ called primary winding
Winding $N_C$ called control winding
Winding $N_O$ called output winding The primary windings $N_A$ of both cores are connected, in a manner to be described for reference purposes as series aiding, across an alternating-current source G, having terminals 15 and 16, in series with a current-limiting resistor 17.

The control coils $N_C$ (one or more of which could be used on each core) are connected to one another in series opposition, i. e. their sense of interconnection is the opposite of that of windings $N_A$.

The windings $N_O$ are also connected in series opposition to each other, i. e. in the same relative sense as windings $N_C$. They are further connected across the emitter-base circuit of a transistor 18 as shown in Fig. 1. A load impedance 19 is connected on the output side of the transistor 18, i. e. across its collector-base circuit. A capacitor 20 can be connected across the load 19.

In series with the control coils $N_C$ there is placed an impedance which, by way of example, has been shown as an inductance 12 shunted by a capacitance 21. This impedance is used to block the harmonics flowing in the control circuit. In this way higher gains are obtained with the apparatus which is the subject of this invention. By the presence of capacitor 21, the gain of this amplifier is still further increased and its transient response improved.

The mode of operation of a magnetic amplifier as shown in Fig. 1, in whose output there appear only even harmonics of the frequency of alternating-current source G, may be assumed to be known per se except for the improvement afforded by the inclusion of transistor 18 in the output circuit which is composed solely of passive elements. When an A.-C. driving voltage is applied at 15, 16 and a D.-C. signal voltage at 13, 14, current will readily pass from the electrode **18*e* of the transistor, shown conventionally as an emitter, to the base electrode 18*b* when the terminal connected to winding $N_O$ of core 11 is positive with respect to that connected to winding $N_O$ of core 10. Under these conditions the transistor 18 acts as a rectifier in shunt with the load 19** and very little current will flow through the latter.

On the next half-cycle, however, the electrode **18*e* is negatively biased with respect to the base 18*b* and thus, in effect, becomes the collector of a transistor whose emitter, the erstwhile collector electrode 18*c*, is held at substantially zero bias. Under these circumstances there will be an appreciable flow of electrons from the upper electrode 18*e* to the lower electrode 18*c* of the transistor, these electrons bypassing the base 18*b* and setting up a current flow through the load 19. Since the same phenomenon is repeated on alternate half-cycles, the load 19 will be traversed by a pulsating current whose pulsations will be smoothed by the shunt condenser 20**.

Figure 2:
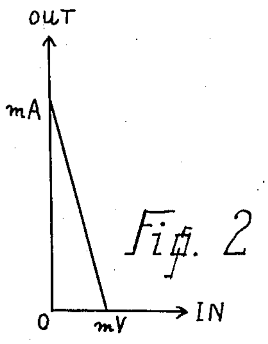
Fig. 2 is a graph showing the output characteristics of the system illustrated in Fig. 1.

It has been found that the amplitude of this current is very nearly proportional to the control voltage applied between terminals 13, 14, this linearity being presumably due to the fact that the distortion introduced by the magnetic amplifier is substantially compensated by the distortion of the transistor operated in the passive manner described. The output current through the load 19 varies linearly with the input voltage across terminals 13, 14 as plotted in Fig. 2.

Figure 4:
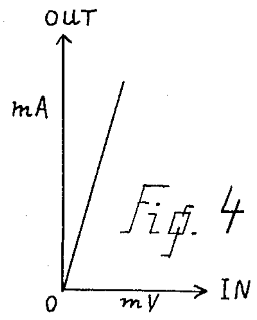
Fig. 4 is a graph similar to Fig. 2 but relating to the system of Fig. 3.
Figure 3:
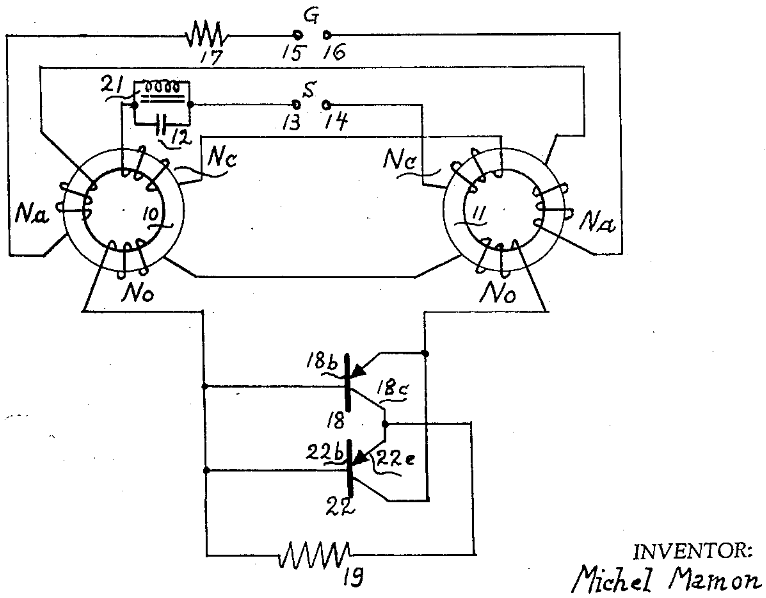
Fig. 3 is another embodiment with an output circuit containing two transistors in cascade.

Another aspect of the present invention is shown in Fig. 3. Here two transistors 18 and 22 are connected in cascade across the output windings $N_O$, with collector **18*c* tied to emitter 22*e* and their junction connected to the two bases 18*b*, 22*b* through the load 19**. The output current of this amplifier is directly proportional to its input voltage, starting from zero as shown in Fig. 4.

Figures 5, 6:
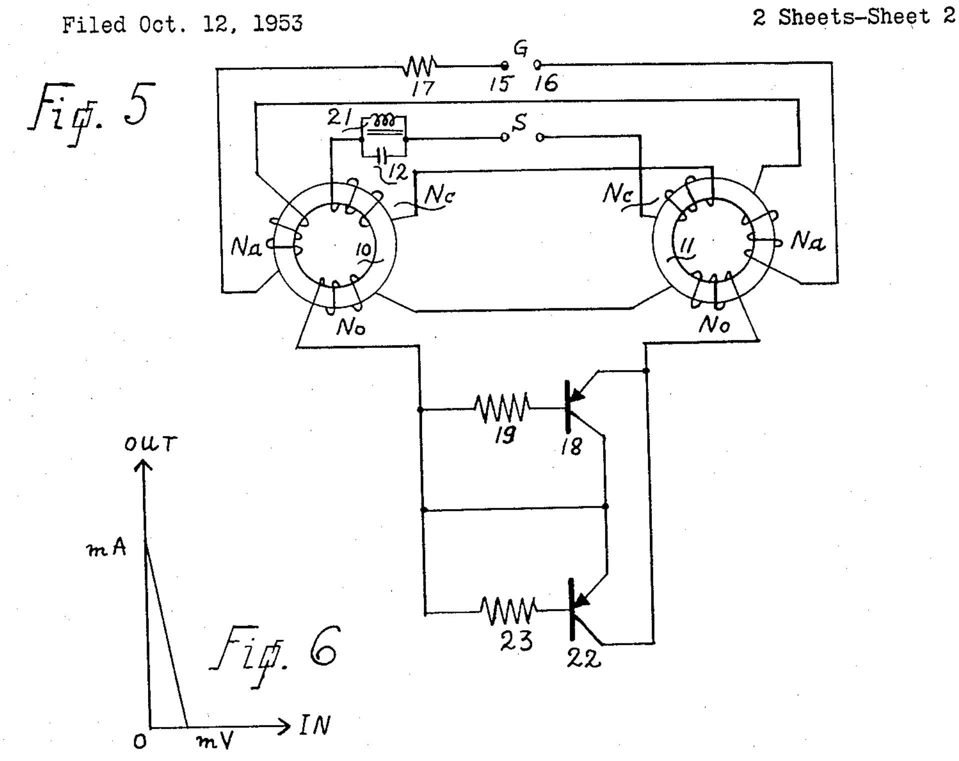
Fig. 5 is a third embodiment comprising an output circuit with two transistors connected back to back.
Fig. 6 is a graph similar to Figs. 2 and 4 but relating to the system illustrated in Fig. 5.

In Fig. 5 there is shown still another aspect of the present invention: Two transistors 18 and 22 have their emitter-collector circuits connected back to back across the output coils $N_O$, with two load resistors 19 and 23 in series with their bases as shown in Fig. 5. The output characteristic of this arrangement is similar to that of the system of Fig. 1 as shown in Fig. 6.

In all the circuits shown in Figs. 1, 3 and 5, biasing D.-C. voltages can be introduced in the transistor input circuits as known in the art of transistors. These D.-C. biases will still further increase the gain of the amplifier according to this invention.

Two or more amplifiers in accordance with this invention can be cascaded to give a still higher output. The amplifier described herein can be used as a preamplifier in conjunction with other types of amplifiers, not necessarily related to this invention. Positive or negative feedback can be used separately or jointly with the circuits of the present invention. Positive feedback will give a more curved output characteristic with somewhat higher gain for a given signal. Negative feedback can improve the linearity of the output characteristics of an amplifier according to the present invention and increase the dynamic input impedance relative to that of the signal source. Very good sensitivity was obtained with such amplifier when the signal source was a thermocouple or a similar low-level source. The current-limiting resistor 17 can be omitted if the primary windings $N_A$ are wound with a wire of higher cross-section. This, of course, will take more "window area" and the useful power output of the amplifier will be somewhat less than when a limiting resistor is used.

Figure 7:
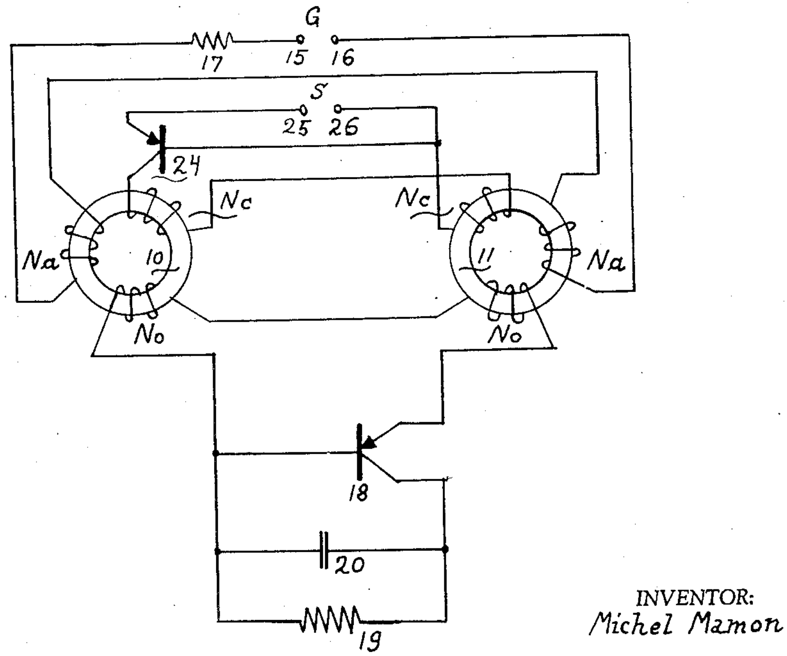
Fig. 7 shows a further modification of a magnetic amplifier according to my invention.

The magnetic amplifier embodying the present invention can receive and amplify a low A.-C. signal. Thus, as shown in Fig. 7, a transistor 24 has its emitter-base circuit connected between an alternating-current signal source 25 and the control coils $N_C$ of the magnetic amplifier previously described.

What I claim is:

1. A magnetic amplifier comprising, in combination, a first and a second core, a first winding on each of said cores, a source of alternating current connected across said first windings, a second winding on each of said cores, a source of control current connected across said second windings, a third winding on each of said cores, said second windings and said third windings being relatively interconnected in a sense opposite to that of said first windings, thereby giving rise to a second-harmonic output in said third windings, and circuit means for improving the linearity of said output, said circuit means comprising transistor means having an input circuit connected in series with said third windings, said transistor means further having an output circuit composed solely of passive impedance elements and including a load.

2. A magnetic amplifier according to claim 1, wherein said impedance elements include condenser means bridged across said load.

3. A magnetic amplifier according to claim 1, wherein said transistor means comprises a transistor having an emitter electrode, a collector electrode and a base electrode, said input circuit extending between a first combination of two of said electrodes, said output circuit extending between a second combination of two of said electrodes.

4. A magnetic amplifier according to claim 3, wherein said first combination includes said emitter and base electrodes, said second combination including said collector and base electrodes.

5. A magnetic amplifier according to claim 3, wherein said first combination includes said emitter and collector electrodes, said second combination including said base and collector electrodes.

6. A magnetic amplifier according to claim 1, wherein said transistor means comprises a first and a second transistor connected in cascade.

7. A magnetic amplifier according to claim 1, wherein said transistor means comprises a first and a second transistor connected back to back.

References Cited in the file of this patent

UNITED STATES PATENTS

| | | |
|---|---|---|
| 1,544,381 | Elmen | June 30, 1925 |
| 1,696,860 | Pearne | Dec. 25, 1928 |
| 2,524,035 | Bardeen et al. | Oct. 3, 1950 |
| 2,636,150 | McKenney et al. | Apr. 21, 1953 |
| 2,653,282 | Darling | Sept. 22, 1953 |
| 2,686,290 | Macklen | Aug. 10, 1954 |
| 2,695,993 | Haynes | Nov. 30, 1954 |
| 2,710,928 | Whitney | June 14, 1955 |
| 2,751,545 | Chase | June 19, 1956 |
| 2,759,142 | Hamilton | Aug. 14, 1956 |
| 2,798,904 | Alexanderson | July 9, 1957 |

FOREIGN PATENTS

| | | |
|---|---|---|
| 684,626 | Great Britain | Dec. 24, 1952 |

OTHER REFERENCES

Article by Sack et al.: 1947 Proceedings of IRE, pp. 1376–1377. (Copy in 179—171—MA.)

"Electronics," August 1953, pages 136–140, Richard H. Spencer "Transistor Controlled Magnetic Amplifier."